United States Patent
Maciorowski et al.

(10) Patent No.: US 9,384,102 B2
(45) Date of Patent: Jul. 5, 2016

(54) REDUNDANT, FAULT-TOLERANT MANAGEMENT FABRIC FOR MULTIPARTITION SERVERS

(75) Inventors: David Maciorowski, Longmont, CO (US); Wendy Wiehardt, Fort Collins, CO (US); Ted Cross, Fort Collins, CO (US); Michael Young, legal representative, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1210 days.

(21) Appl. No.: 12/637,786

(22) Filed: Dec. 15, 2009

(65) Prior Publication Data

US 2011/0145630 A1 Jun. 16, 2011

(51) Int. Cl.
*G06F 11/20* (2006.01)
(52) U.S. Cl.
CPC .................. *G06F 11/2007* (2013.01)
(58) Field of Classification Search
CPC .................................................... H04L 45/28
USPC ........................................................ 370/228
See application file for complete search history.

(56) References Cited

U.S. PATENT DOCUMENTS

| | | | |
|---|---|---|---|
| 5,227,957 A * | 7/1993 | Deters ....................... | 361/679.32 |
| 5,485,576 A * | 1/1996 | Fee et al. ........................ | 714/56 |
| 6,005,920 A * | 12/1999 | Fuller et al. ................... | 379/9.05 |
| 7,818,408 B1 * | 10/2010 | Ignatuk et al. ................ | 709/221 |
| 2004/0213292 A1 * | 10/2004 | Willhite et al. ............... | 370/477 |
| 2008/0025683 A1 * | 1/2008 | Murano ......................... | 385/135 |
| 2008/0304232 A1 * | 12/2008 | Rozzi et al. ................... | 361/687 |
| 2009/0031051 A1 * | 1/2009 | Nguyen .......................... | 710/15 |

OTHER PUBLICATIONS

Li et al. Cisco Hot Standby Router Protocol (HSRP). The Internet Society. Network Working Group. RFC 2281. Mar. 1998.*
Cisco. Hot Standby Router Protocol Features and Functionality. Jun. 18, 2006. <http://web.archive.org/web/20060618071912/http://www.cisco.com/en/US/tech/tk648/tk362/technologies_tech_note09186a0080094a91.shtml>.*

* cited by examiner

*Primary Examiner* — Hassan Kizou
*Assistant Examiner* — Ashil Farahmand
(74) *Attorney, Agent, or Firm* — Trenner Law Firm, LLC

(57) ABSTRACT

Redundant, fault-tolerant management fabric for multipartition servers are disclosed. In an exemplary embodiment, a method comprises connecting a plurality of rack system components to a first network segment, the connection including at least two physical links sharing a single network address. The method also comprises monitoring communications paths in the first network segment. The method also comprises switching communications from the first network segment to a failover network segment if there is a failure in any of the communications paths in the first network segment.

16 Claims, 12 Drawing Sheets

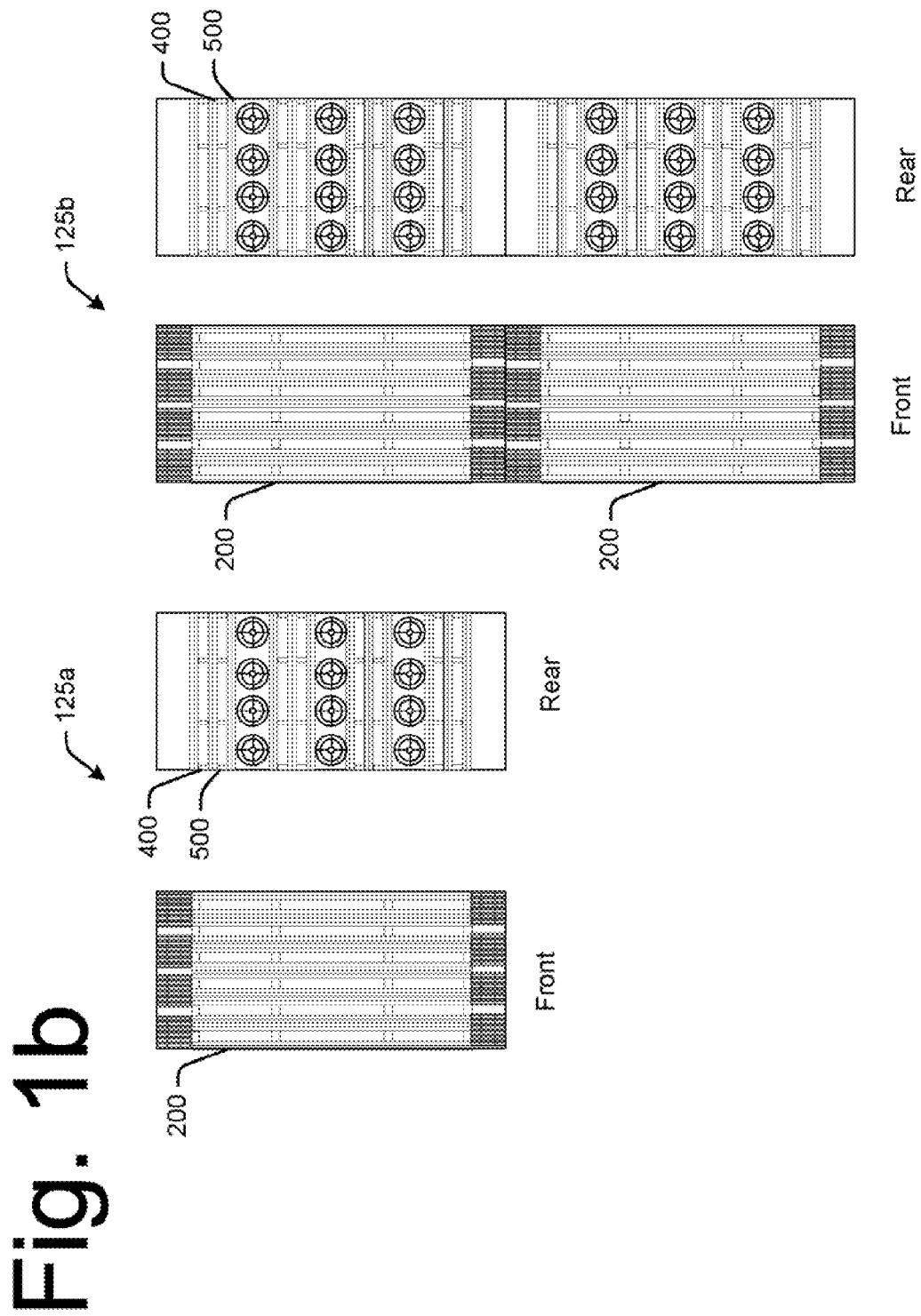

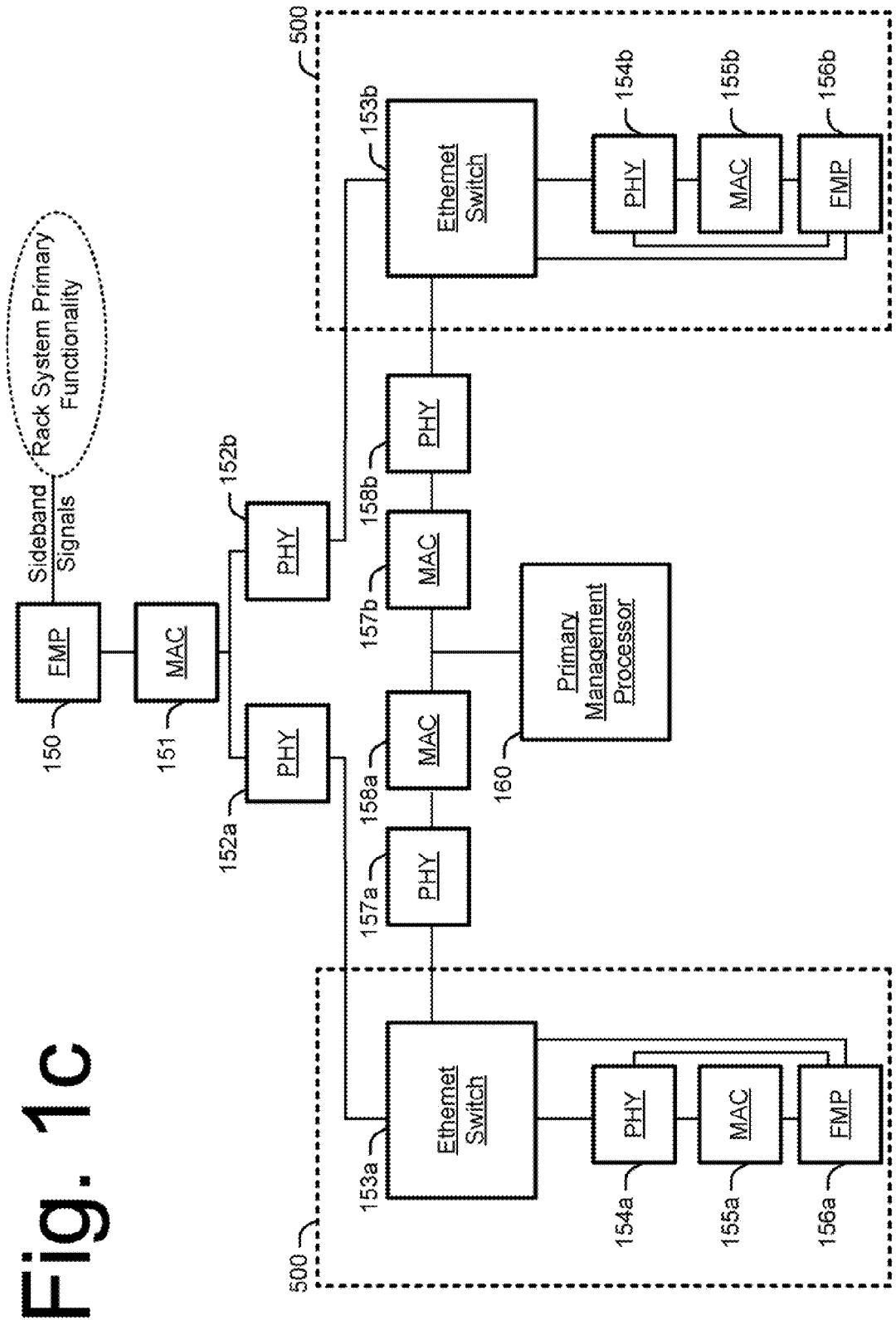

Xbar

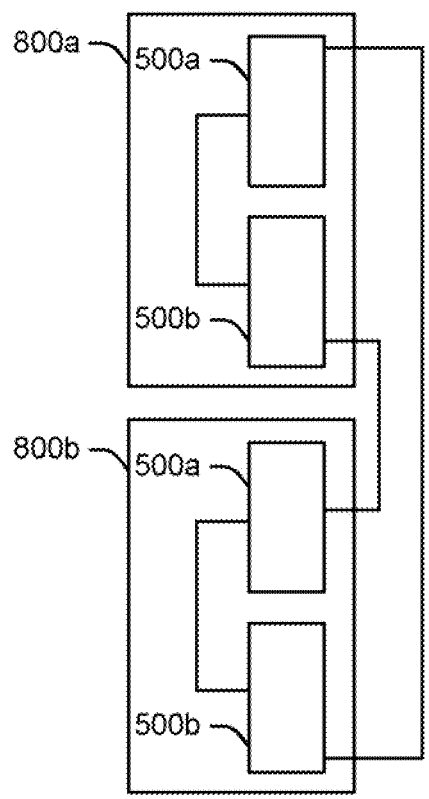
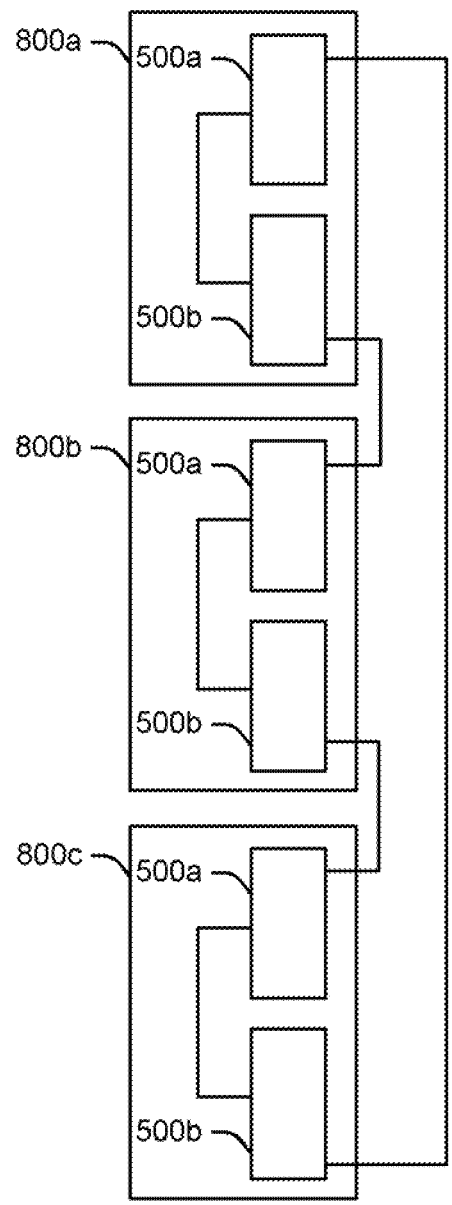

REDUNDANT, FAULT-TOLERANT MANAGEMENT FABRIC FOR MULTIPARTITION SERVERS

BACKGROUND

Rack systems are becoming increasingly commonplace, particularly in enterprise environments. Exemplary rack systems may include multipartition servers providing enhanced processing capacity, and other shared resources (e.g., input/output or I/O, networking, and memory). A network fabric may link the servers to the shared resources so that the multipartition servers and other shared resources appear to an end-user (or simply "user") as a single server system.

A management subsystem uses sideband signals to communicate with the server processor(s) and other system devices, (e.g., I/O controllers) and bring information to a common point accessible to the user. A management subsystem detects the presence of the processors in the multipartition server, controls power to the processors of the multipartition server, and monitors status of the processors of the multipartition server. The management subsystem can also monitor and correct functionality on other devices throughout a server environment. The hardware required for the management subsystem consumes space on the server boards and increases overall complexity, thereby increasing costs.

BRIEF DESCRIPTION OF THE DRAWINGS

FIG. 1b shows exemplary flat plan views of exemplary rack systems in which an exemplary redundant, fault-tolerant management fabric may be implemented. FIG. 1c is a block diagram showing components of an exemplary redundant, fault-tolerant management fabric which may be implemented in the rack systems.

FIGS. 8a-c show exemplary interconnections of multiple main enclosures to provide: a) a 16 system board configuration, b) a 24 system board configuration, and c) a 32 system board configuration.

DETAILED DESCRIPTION

It is often desirable to control and monitor a high availability server. Exemplary embodiments described herein provide a flexible fault-tolerant management subsystem solution that accommodates a multitude of server configurations while maintaining low cost, low complexity and high security.

The systems and methods overcome topology problems associated with redundant fabrics with multiple route options between entities on the network. Not only are management requirements stringent enough to encourage making the network as much of a reliable transport as possible, but the systems and methods still adjust for un-reliable transport in actual operation. In addition, the fabric is easily extensible to multiple enclosures.

In an exemplary embodiment, an enterprise class server may be utilized, e.g., including one or more multipartition system board servers in a rack environment. A redundant, fault-tolerant management fabric is disclosed to help ensure high availability of the server. In particular, an intra-server network and variations thereof are disclosed which supports virtualization of resources as well as the control and monitoring of functions.

A redundant, fault-tolerant management fabric provides design freedom to implement other system management features. The virtualized functions of the system may be carried as traffic over the management fabric instead of over dedicated connections from each system board to a common point for access by a management processor. The management processor provides customer access to the customer OS's running in various partitions implemented throughout the server. Many, if not all, of the functions that might otherwise be implemented by sideband connections directly to the management processor may also be moved to the management fabric. Accordingly, the systems and methods disclosed herein may reduce hardware needed on the system board(s), thereby reducing over complexity and costs.

Exemplary implementations are non-obtrusive to the main server processors and can run on a separate processor with separate operating system and memory. Accordingly, the management subsystem does not hamper the server processing or memory resource functions; and if there are problems with server processors or memory, the management subsystem can detect these problems without being adversely impacted. The management subsystem is fault tolerant such that the management subsystem can continue to function even in the event of a fault.

Figure 1A:
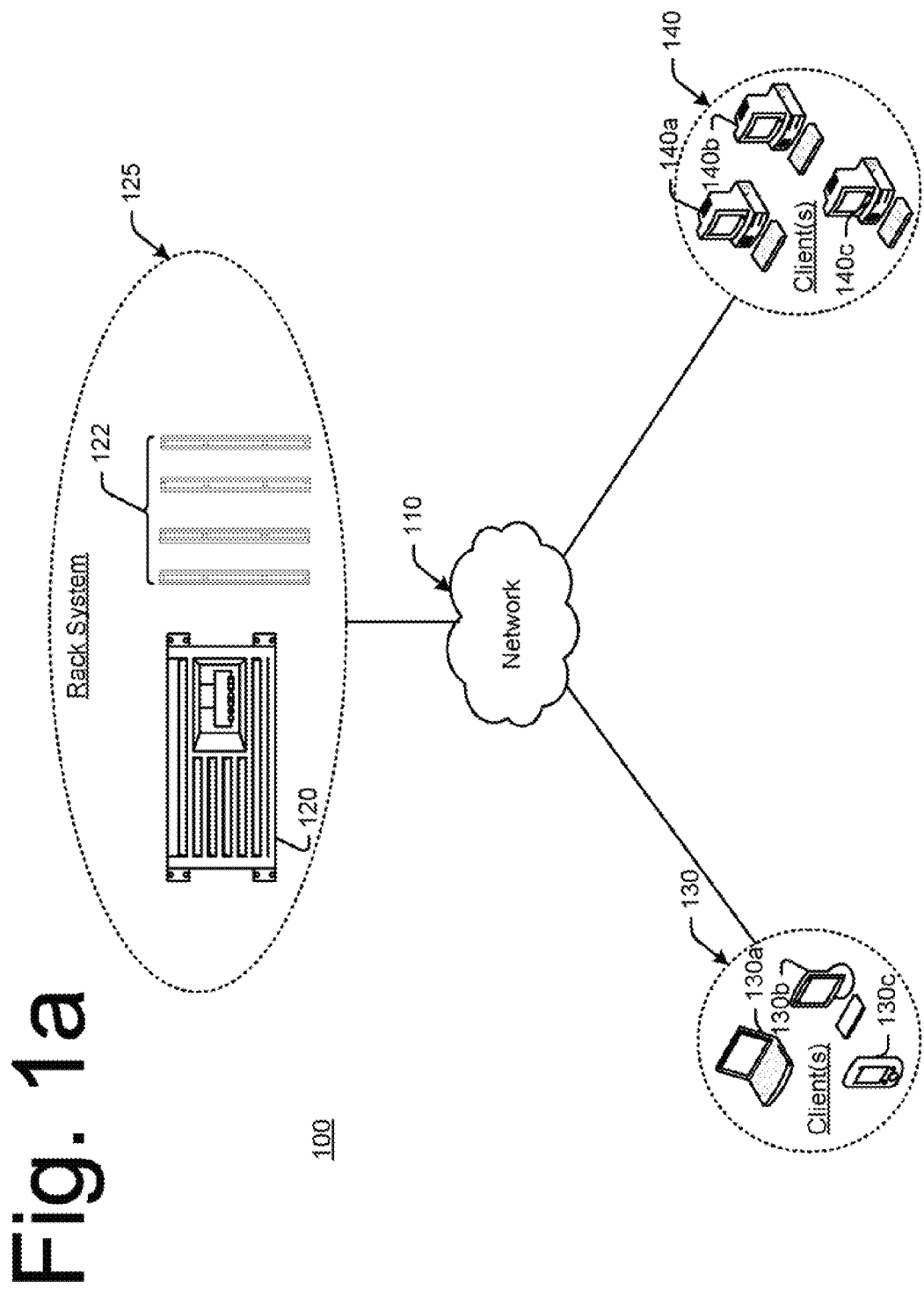
FIG. 1a is a high-level illustration of an exemplary networking environment including a rack system.

FIG. 1a is a high-level illustration of an exemplary networking environment 100 including a rack system. It is noted, however, that in exemplary embodiments, the redundant, fault-tolerant management fabric may be isolated from the external network for security purposes, as described in more detail below. FIG. 1b shows exemplary flat plan views of exemplary rack systems 125 in which an exemplary redundant, fault-tolerant management fabric may be implemented. The redundant, fault-tolerant management fabric may be implemented between components in the exemplary rack systems 125, as shown for example in FIG. 1c. FIG. 1c is a block diagram showing components of an exemplary redundant, fault-tolerant management fabric which may be implemented in the rack systems 125.

The networking environment 100 may include one or more communication networks 110, such as a local area network (LAN), wide area network (WAN), a direct link, and/or other suitable communications fabric. A rack system 125 may be implemented in the networking environment 100.

Rack system 125 may include a computing system, such as one or more system board 120 (e.g., a multipartition, enterprise class server board). Rack system 125 may also include a number of shared resources 122 (e.g., memory boards, networking boards, etc.). In FIG. 1b, the rack system 125a is shown in an eight system board configuration; and the rack system 125b is shown in a sixteen system board configuration. Both front and rear plan views are shown. In the front view, exemplary server system boards 200 are visible, and in the rear view, exemplary crossbar boards 400 and utility boards 500 are visible.

System board 120 may execute a variety of applications implemented in software (e.g., database management). System board 120 may also provide services to other computing or data processing systems or devices. For example, system board 120 may also provide transaction processing services, network services (e.g., email and Internet or other remote access), etc. In an exemplary embodiment, the system board 120 is a high-availability server. That is, the system board 120 does not suffer from downtime. If one of the servers (or partitions within a server system board) and/or shared resources is taken offline (e.g., due to a failure, upgrade, etc.), another server (or partition within a server system board) and/or shared resources takes the place of the offline device such that any downtime is transparent to the user. Accordingly, it may be desirable to control and monitor a high availability server. A redundant, fault-tolerant management fabric may be implemented in the rack system 125 to help ensure high availability of the server.

With reference to FIG. 1c, the fabric implements a protocol based on the IEEE 802.3 (Ethernet) specification. In other exemplary embodiments, the communications may be implemented, such as serializer/deserializer (SerDes), media independent interfaces, serial gigabit media independent interface (SGMII), 10/100/1000 Base-T and/or 10G Base-T, or other Ethernet or non-Ethernet protocols.

Implementing a redundant fault-tolerant management fabric provides the design freedom to implement other system management features in a different way. The virtualized functions of the system can now be carried as traffic over the management fabric instead of requiring dedicated connections from each board to a common point for access by the management processor. Most of the functions implemented by the sideband signals can also be moved to the management fabric. All these system optimizations reduce cost and board space.

The topology of the CAMNet (Complex Area Management Network) fabric may be based on a number of design considerations. Exemplary design considerations include, but are not limited to, the size of the various system/complex types, expected traffic, performance, reliability and availability; security, debug, bus speed, protocol (e.g., IEEE 802.3), and cost.

In an exemplary embodiment, the topology provides two paths to every board so that loss of a single link, switch or PHY does not make an entity unreachable. Of course more than two paths may also be implemented. Also in an exemplary embodiment, the topology may provide architectural consistency among nodes of the same type to enhance hardware and firmware leverage.

CAMNet traffic is generated by management firmware running on management processors attached to the CAMNet. Sources not directly connected to the CAMNet, such as system processors on the system boards or user devices, may initiate or consume traffic, but may still be accomplished through a management processor, such as the management processor (e.g., a processor dependent hardware controller (PDHC) or onboard administrator (OA)). Traffic from outside the system may be managed by OA firmware.

Each component of the CAMNet may be connected through cable or via a common midplane in the rack system 125. Of course, the connection is not limited to being within the rack. The CAMnet can be cabled between racks (e.g., from utility board to IOX). Traffic is distributed by the switch 520 on the utility board 500. Each board has its own Fabric Message Processor (FMP) to which traffic may be addressed. With the exception of the OA, each board may have an FMP embedded in an FPGA which uses an embedded 10/100 Media Access Control (MAC). Of course faster speeds (e.g., 1000, 10G, or higher may also be implemented). In an exemplary embodiment, Direct Memory Access (DMA) controller and MAC registers are accessed via FMP. DMA transfers may occur between the MAC interface and SRAM.

Again with reference to FIG. 1c, the CAMNet may include a fabric management processor (FMP) 150 communicatively coupled to a media access controller (MAC) 151 and two physical layer transceivers (PHYs) 152a and 152b. Only one of these PHYs 152a and 152b is active at a time. The PHYs 152a and 152b are connected via a physical layer interface.

The physical layer interface can be routed across a midplane or backplane board to connect between different boards. Or the physical layer interface can be routed through a cable to connect to other rack system components (e.g., separate I/O expanders or other rack enclosures, e.g., between rack systems 125a and 125b in FIG. 1b). To help ensure that the cabled interface cannot be connected to the public network, a unique signal wiring is implemented between the PHY and the cable connector for the CAMNet interface on all rack system components such that no standard MDI or MDI-X crossover cable can be used to connect the CAMNet to a public network.

The physical layer interface connects the PHYs 152a and 152b to Ethernet switches 153a, 153b, respectively on a utility board 500. The Ethernet switches 153a, 153b may have serDes and SGMII capability. MACs are embedded in the switch for each port. PHYs may also be embedded for each port. The Ethernet switches 153a, 153b are connected by sideband signals (e.g., for configuration of the switch and PHY), and via a physical layer interface, to the PHY 154a, 154b, MAC 155a, 155b, and FMP 156a, 156b. The FMP, MAC and/or PHY may be embedded in an FPGA or a system on a chip (SOC). In an exemplary embodiment, the FMP and the corresponding MAC are embedded on an FPGA on most boards. On the PDHC, these are embedded in an SOC.

The Ethernet switches 153a, 153b may be connected via a physical layer interface via a PRY 157a, 157b and MAC 158a, 158b to a primary management processor 600. In an exemplary embodiment, these are located on an OA board 600. It is noted that sideband signals going to the MAC and PHYs for configuration of the MAC and PHYs are not shown.

Exemplary components of the CAMNet topology will now be described in detail with reference to FIGS. 2-6. An exemplary 8 system board CAMNet topology implementing these components according to an exemplary embodiment will then be described with reference to FIG. 7. Of course other topologies with more than 8 system boards or fewer than 8 system boards are also contemplated (e.g., 4 system board CAMNet or 16 system board CAMNet topology, etc.).

Figure 2:
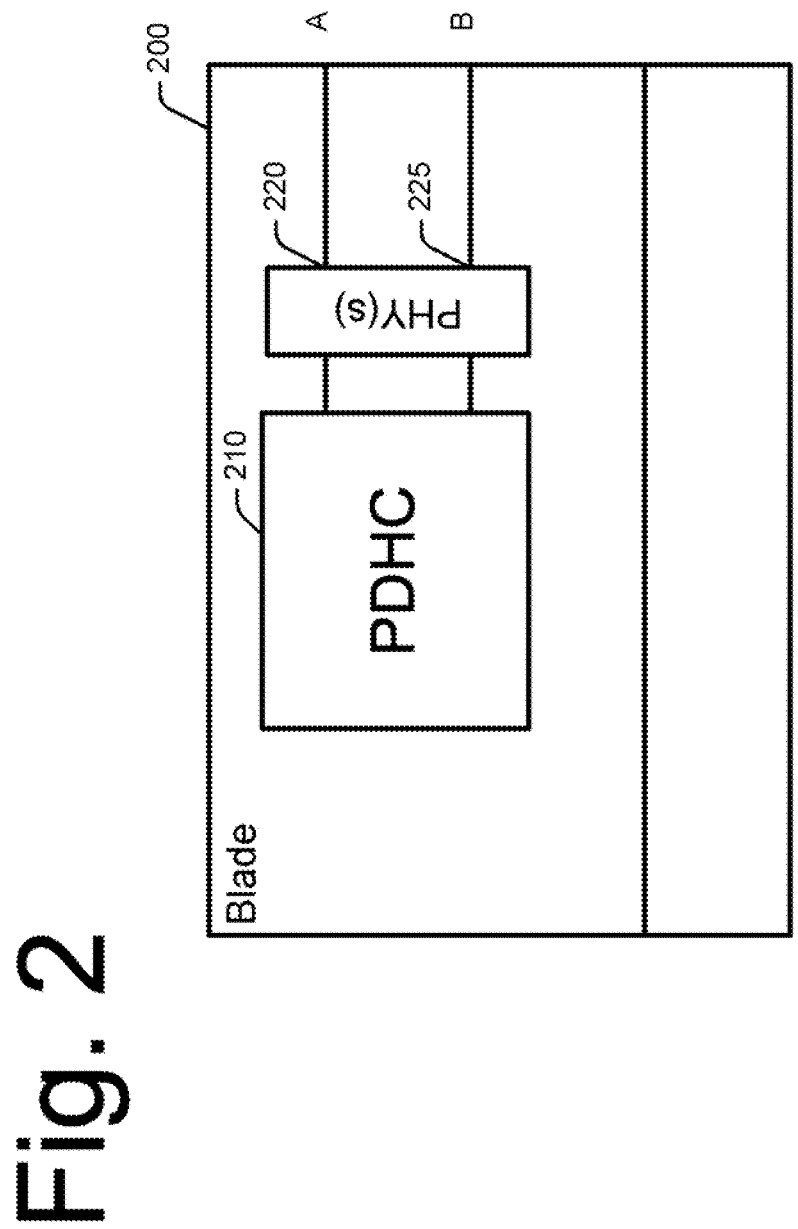
FIG. 2 is a block diagram of an exemplary system board which may be implemented with the redundant, fault-tolerant management fabric.

FIG. 2 is a block diagram of an exemplary server system board 200 which may be implemented in the redundant, fault-tolerant management fabric. In an exemplary embodiment, each server system board 200 contains a processor dependent hardware controller (PDHC) 210 with a single Ethernet address (e.g., MAC) and two PHY ports 220, 225 that provide a connection to two Ethernet network segments for redundancy. The PDHC 210 may be implemented as a system on a chip (SOC), and may include a management processor, MAC (s), DMA controller, etc. The microprocessor firmware implementation includes a network stack and an algorithm to select an active network segment for communications. Each Ethernet network segment is implemented with an Ethernet switch with sufficient ports to connect to all system boards in the server. The management processor on the PDHC 210 provides access to the user operating systems executing in various partitions throughout the server. If any communications path (or component in the communications path) fails, a firmware algorithm causes communications to switch to the alternate network segment.

The PDHC 210 has two network interfaces. The primary and secondary CAMNet interfaces on the PDHC 210 may use tri-mode (10/100/1000 Base-T) MACs embedded in the microprocessor. Each connection to the CAMNet uses a PHY 220, 225 to convert from a media independent interface (reduced gigabit media independent interface (RGMII), gigabit media independent interface (GMII), etc.) to 1000BASE-BX (clockless SerDes). The CAMNet links are routed to the appropriate switches 520 via a midplane connector to two separate utility boards 500 for redundancy. The PDHC interfaces to the system board functions through sideband signals to monitor and control the manageability functions of the system board. The FMP functionality on the PDHC feeds system board status information back through CAMNet to a central location.

Figure 3:
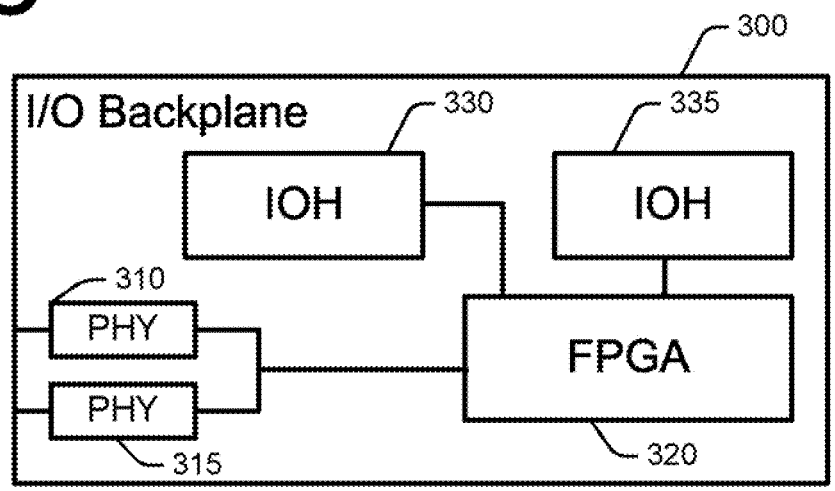
FIG. 3 is a block diagram of an exemplary I/O backplane which may be implemented with the redundant, fault-tolerant management fabric.

FIG. 3 is a block diagram of an exemplary I/O backplane 300 which may be implemented in the redundant, fault-tolerant management fabric. The Fabric Message Processor (FMP) on the I/O backplane 300 may use a single 100 Mbps MAC and two redundant PHYs 310, 315 to provide a path to the CAMNet fabric. The PHY is a device that translates between the media independent interface and physical media dependent interface of an 802.3 network, and implements the physical layer of the network stack. The PHYs 310, 315 connect via cables to two separate utility boards 500 for redundancy. The FMP interfaces to the I/O controllers (IOH) 330, 335 through sideband signals to monitor and control the manageability functions of the IOH. The FMP feeds I/O status information back through CAMNet to a central location.

Figure 4:
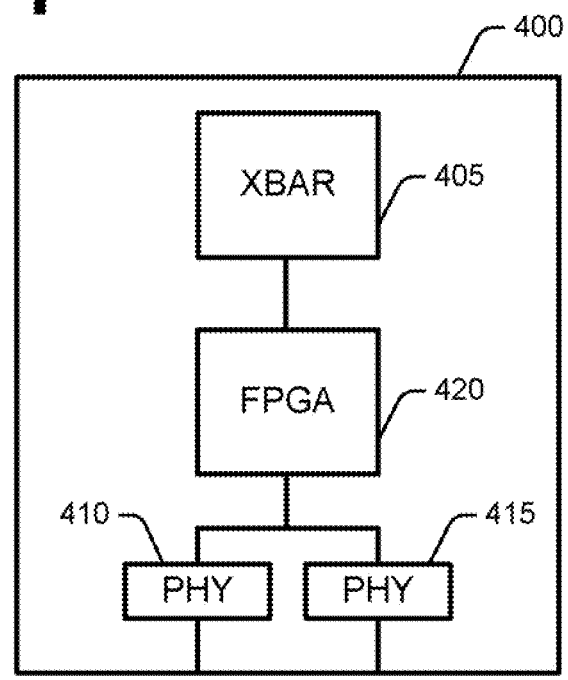
FIG. 4 is a block diagram of an exemplary crossbar which may be implemented with the redundant, fault-tolerant management fabric.

FIG. 4 is a block diagram of an exemplary crossbar board 400 which may be implemented in the redundant, fault-tolerant management fabric. Of course, the crossbar board 400 is not required in a CAMNet, but may be implemented in exemplary embodiments. The FMP on the crossbar (XBar) board 400 uses a single 100 Mbps MAC with redundant PHYS 410, 415 to provide a path from the crossbar 405 to the CAMNet fabric. The 10/100 MAC is embedded in the FPGA 420 with the FMP's processor. The CAMNet links are routed to the appropriate switches 520 via a midplane connector to two separate utility boards 500 for redundancy. The FMP interfaces to the crossbar 405 through sideband signals to monitor and control the manageability functions of the crossbar 405. The FMP interfaces to the crossbar status information back through. CAMNet to a central location.

Figure 5:
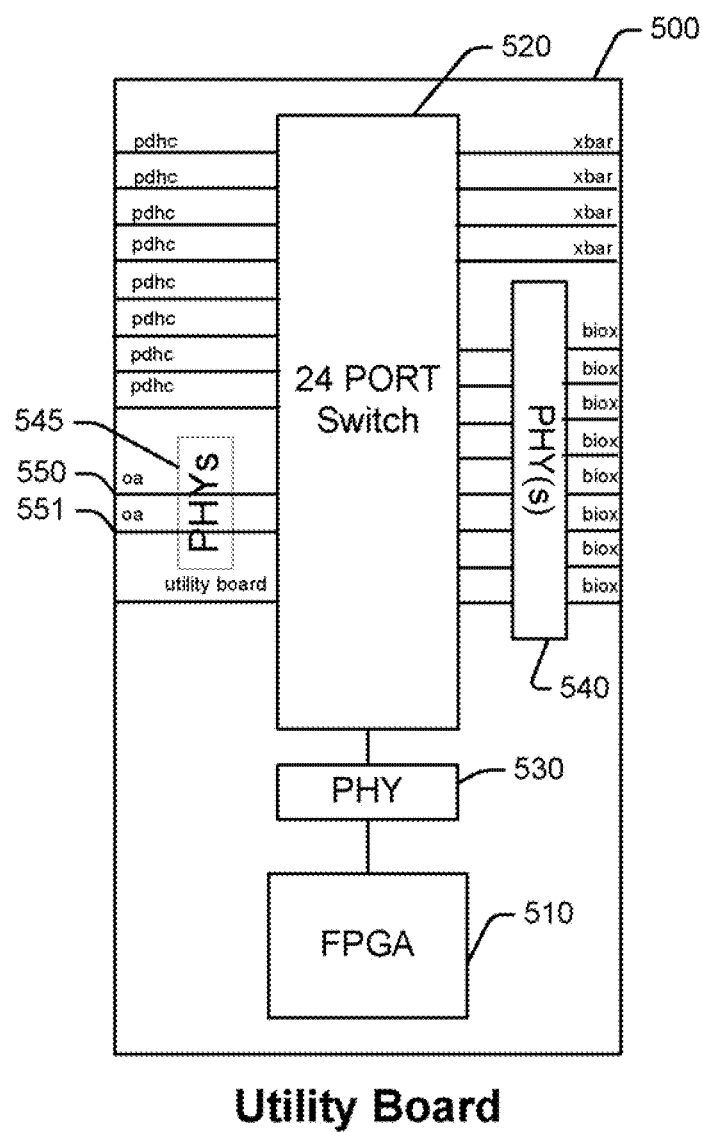
FIG. 5 is a block diagram of an exemplary utility board which may be implemented with the redundant, fault-tolerant management fabric.

FIG. 5 is a block diagram of an exemplary utility board 500 which may be implemented in the redundant, fault-tolerant management fabric. The utility board 500 serves as a central distribution location for the functionality of other boards in the fabric. The utility board 500 may have a single MAC in the FMP FPGA 510. This MAC connects to a gigabit Ethernet 24-port switch 520 on the board via PHY 530. The switch 520 distributes CAMNet to other boards, the switch on the other utility board, external 1000BASE-T connections (e.g., to the I/O enclosure (BIOX)), and the FMP. The switch 520 may have a management data controller/management data input/output (MDC/MDIO) interface for setup and control. This interface could also be serial peripheral interface (SPI) protocol, media independent interface (MII) protocol or any other common switch management interface protocol.

The PHY 530 connecting the FPGA 510 and switch 520 may also share this interface for register access. This interface connects to the MAC in the FMP FPGA 510 as the master on the MDC/MDIO bus.

The switch 520 includes integrated SerDes on all of its MACs and integrated SGMII interface on all gigabit ports. This allows for reduced pin count of the signals that pass across the midplane. In contrast to a 1000 Base-T switch, the reduced pincount of SGMII is a cost savings and routing simplification across the entire CAMNet system. External tri-mode (10/100/1000 Base-T) PHYs 540 can be included to enable cabling of the CAMNet network using the lower cost industry-standard Cat5e. External 10/100/1000 Base-T PHYs 545 can also be used to slow down the signals to interface with other portions of the CAMNet network that are not capable of running at Gigabit speeds. The 100 Base-T protocol of the OA 635 connections 550, 551 still maintain the lower cost pincount, but also reduce the CAMNet bus speed to interface with the OA 635.

An exemplary switch 520 implemented on the board 500 may be a 24-port version of the Marvell Prestera DX family of L2 managed switches. The MII port on the switch 520 may be used for control messages. The other ports may be used for mixed data & control messages through use of a tag. The hardware and/or device driver strips off and decodes the tag to separate data and control messages.

The Ethernet switches used in CAMNet may be managed for many of the functions. Switch management is a function provided by the FMP in the FPGA located on the boards 200, 300, 400, and 500.

Reset of the switch 520 may be controlled by the respective FPGA. An FPGA reset causes a switch reset since it looks like a power-on and the FMP has no way to know what state the switch is in when the reset is initiated. FMP firmware may also include a mechanism to reset the switch 520.

After being released from reset, the switch 520 generates a status output to indicate it has completed an internal reset sequence. The FPGA asserts an enable control signal back to the switch 520 to enable normal operations. The switch 520 has a register set and internal memory that are accessible to the FMP as memory mapped I/O via the MDC/MDIO interface.

The switch 520 also maintains counts of various statistics on packet reception and transmission. These may be defined in terms of a Management Information Block (MIB) in network management tools format.

The switch 520 may also have an interrupt line to signal the host CPU (e.g., the FMP) of errors or other events. Interrupts associated with specific events may be enabled or disabled under firmware control. The FMP reads the interrupt cause registers to determine the source of the interrupt.

To allow for debug of the network, the switch 520 may be configured to mirror packets sent or received on one or more ports to another port. This allows use of test equipment, or a specially configured node, to monitor and report on traffic entering or leaving that switch. The switch 520 may also be configured to mirror traffic across multiple interconnected switches. The FMP may set up port mirroring through the control registers accessed over the switch management interface.

Figure 6:
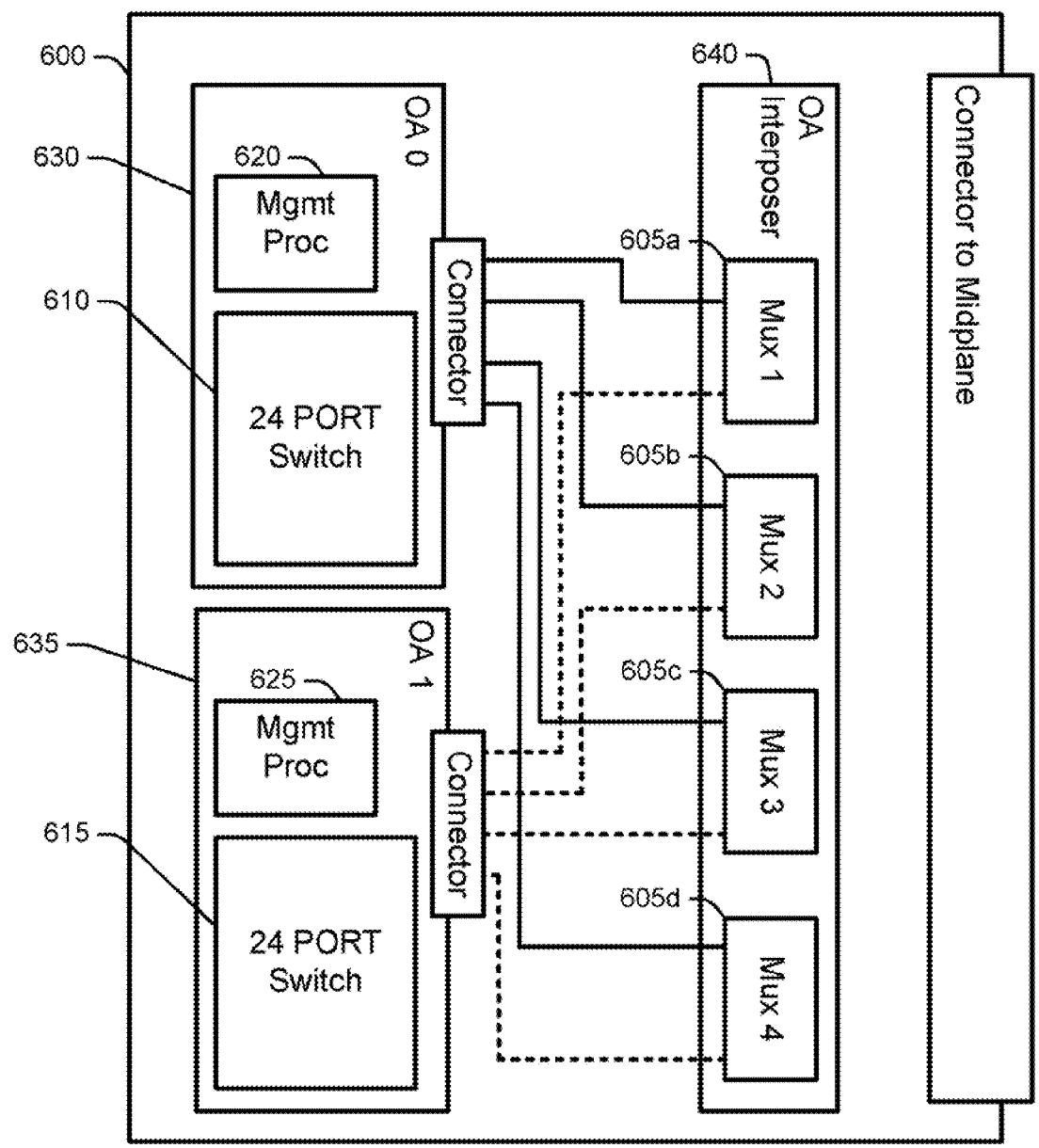
FIG. 6 is a block diagram of an exemplary multiplexer and port switch which may be implemented with the redundant, fault-tolerant management fabric.

FIG. 6 is a block diagram of an exemplary multiplexer board 640 and two management processor boards 630, 635 which may be implemented in the redundant, fault-tolerant management fabric. In order to accommodate redundant management processors on the OAs and the redundant Utility Boards the CAMNet fabric bridged via multiplexers 605*a-d* at level 2 to 10/100 Base-T Ethernet switches 610, 615. The multiplexers allow both OAs 630, 635 to redundantly connect to both utility boards 500 such that if any one of the four boards has a CAMNet failure, a redundant link provides a traffic route. A public connection (e.g., to the Internet or other network) may be provided by microprocessor interfaces 620, 625, but this public connection is isolated from the CAMnet fabric.

Because the CAMNet fabric topology has redundant paths built-in, and because the topology is dynamic, a method may be implemented to determine which path any packet takes from its source to its destination. The fabric may adapt and adjust these paths as nodes, links, and switches come up or go down in the course of normal operations. In an exemplary embodiment, the Rapid Spanning Tree Protocol (RSTP) may be utilized.

Briefly, RSTP functions such that as a node or switch joins the network, that node or switch broadcasts packets announcing its presence, location (e.g., switch number) and current mapping of routes and numbers of hops to the root node of the network. Neighbor nodes and/or switches may reply with current mapping of this same information. All nodes then iterate until agreement is reached on which paths to use. The process may repeat every time something changes in the network.

Figure 7:
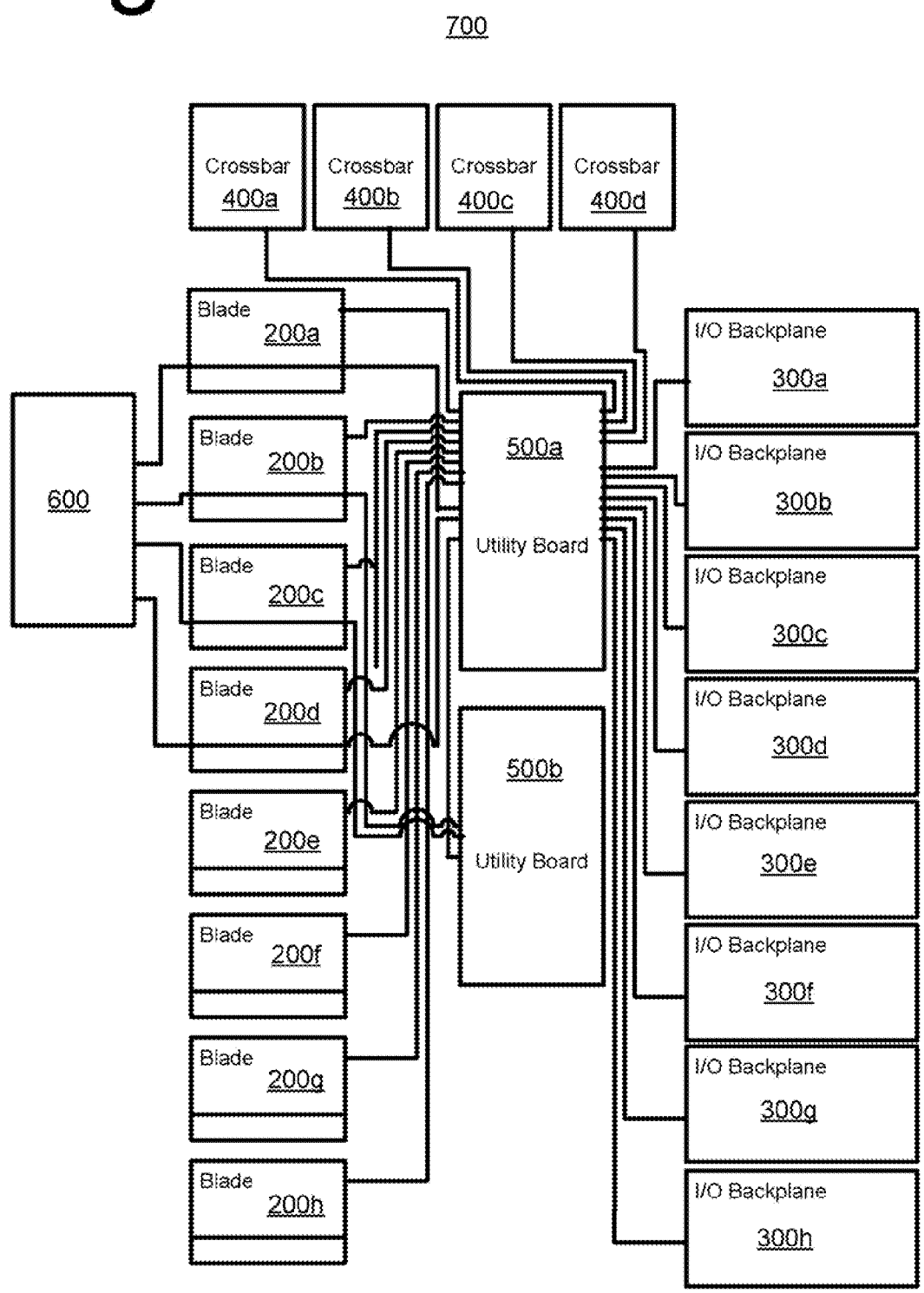
FIG. 7 is a block diagram illustrating an exemplary 8 system board configuration of the redundant, fault-tolerant management fabric.

FIG. 7 is a block diagram illustrating an exemplary 8 system board configuration of the redundant, fault-tolerant management fabric 700. The exemplary topology disclosed herein utilizes both physical addressing (e.g., MAC) and logical addressing (e.g., Internet Protocol (IP) as specified by the IEEE 802.3). Both types of addresses are generated by firmware based on the physical location of the entity in a system. Of course, other embodiments are also contemplated.

In exemplary embodiments, the CAMNet fabric 700 provides at least two switches and at least two paths off each board, (e.g., one to each physical switch). The two switches do not necessarily form two independent networks. Instead, there are connections between the switches allowing for shared redundancy. The switches are connected together via an SGMII link across a common midplane.

The CAMNet fabric 700 uses redundant links and switches implemented in the components described above to reduce the likelihood of a management hardware entity being unable to communicate with the rest of the system. Accordingly, the system is able to 'survive' the loss of a single switch or link without losing communications. An example of this situation is the on-line replacement of a board, such as a utility board 500. Hardware failure of a MAC, PHY, switch, or the board infrastructure may also result in loss of a network path.

In an exemplary embodiment, the PDHC 210 on the server board 200 has two MACs connected to the CAMNet fabric. Accordingly, only one MAC may be active at a time. The address space includes the ability to have different MAC addresses for the primary and secondary MACs.

If excessive errors are detected, the management firmware may take down the primary MAC and enable the secondary MAC. The RSTP recognizes and resolves the resulting network topology and paths in finite time.

During operation, only one MAC may be active at a time. An exception is the utility board (e.g., the MACs within the switch may all be active at any given time). Accordingly, a single MAC address may be used to speed the switchover time on failure. The MAC address appears to have moved to another switch port.

Of course other topologies (e.g., 16 system board, 32 system board, etc.) are also contemplated, as will be readily apparent after becoming familiar with the teachings here. Other exemplary topologies are shown in FIGS. 8*a-c*.

Figure 8C:
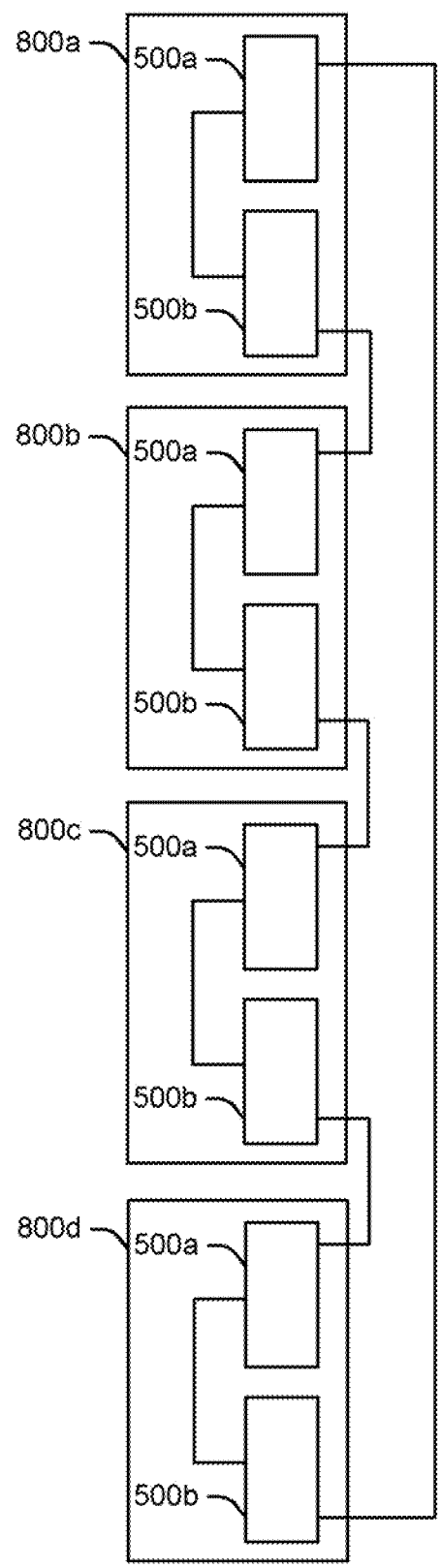

FIGS. 8*a-c* show exemplary interconnections of multiple rack system enclosures 800 to provide: a) a 16 system board configuration, b) a 24 system board configuration, and c) a 32 system board configuration. It is noted that the CAMNet topology is not limited to any particular configuration. The examples shown in FIGS. 8*a-c* are merely illustrative of interconnections, and are not intended to be limiting.

Before continuing, it should be noted that entities connected by the CAMNet have direct control over system resources, so security is a consideration. The general security strategy for CAMNet is to isolate the CAMNet from other networks. However, to accomplish some of the purposes of the system, network traffic may need to enter the CAMNet. The data obtained by the management processor can be accessed externally, but the CAMNet traffic generally should not be accessed anywhere but within CAMNet.

Accordingly, physical access to the system may be restricted by implementing the CAMNet in a data center environment with controlled access. Internal CAMNet MAC addresses are not exposed outside the system. All traffic between the LANs and internal nodes is routed on the OA. CAMNet links from the Utility board to the System board, OA boards and, and Xbar boards are routed on internal midplanes and are thereby isolated from external networks. Links to the BIOXes (IO enclosures) and the inter-rack system links as shown in FIGS. 8*a* and 8*b* are connected to CAMNet via cable links. Cable links are inherently exposed, so the pinouts from the PHY to the cable connectors has been wired in a non-standard configuration. The choice of connector pinout is intended to block a user from inadvertently connecting a CAMNet cable link into the corporate network using industry-standard cabling.

In an exemplary embodiment, CAMNet links carried over cables to/from the utility board and the BIOX conform to the 1000BASE-T standard using a common RJ45 connector. The connectors are wired to the phy in a unique non-standard configuration to achieve the effect of a customized connection, only capable of CAMNet-to-CAMNet interface.

To accomplish the effect of a unique CAMNet-to-CAMNet interface connection, the wiring between the PHY and RJ45 on the board may be modified for each internal CAMNet link on the Utility Board and BIOX. The wiring scheme enables two CAMNet ports connected together to be operable; while mixing a CAMNet and industry standard port is not operable. A standard cable may still be implemented, and signal integrity is maintained through the cable by utilizing the twisted pairs.

A standard 802.3 RJ45 is known as a Media Dependent Interface or MDI connector. The resulting unique connection between the PHY and RJ45 for CAMNet is referred to herein as MDI-C. An industry-standard crossover version is referred to as MDI-X, but this is different from the MDI-C configuration. MDI-C denotes the "MDI-CAMNet" wiring.

Figure 9:
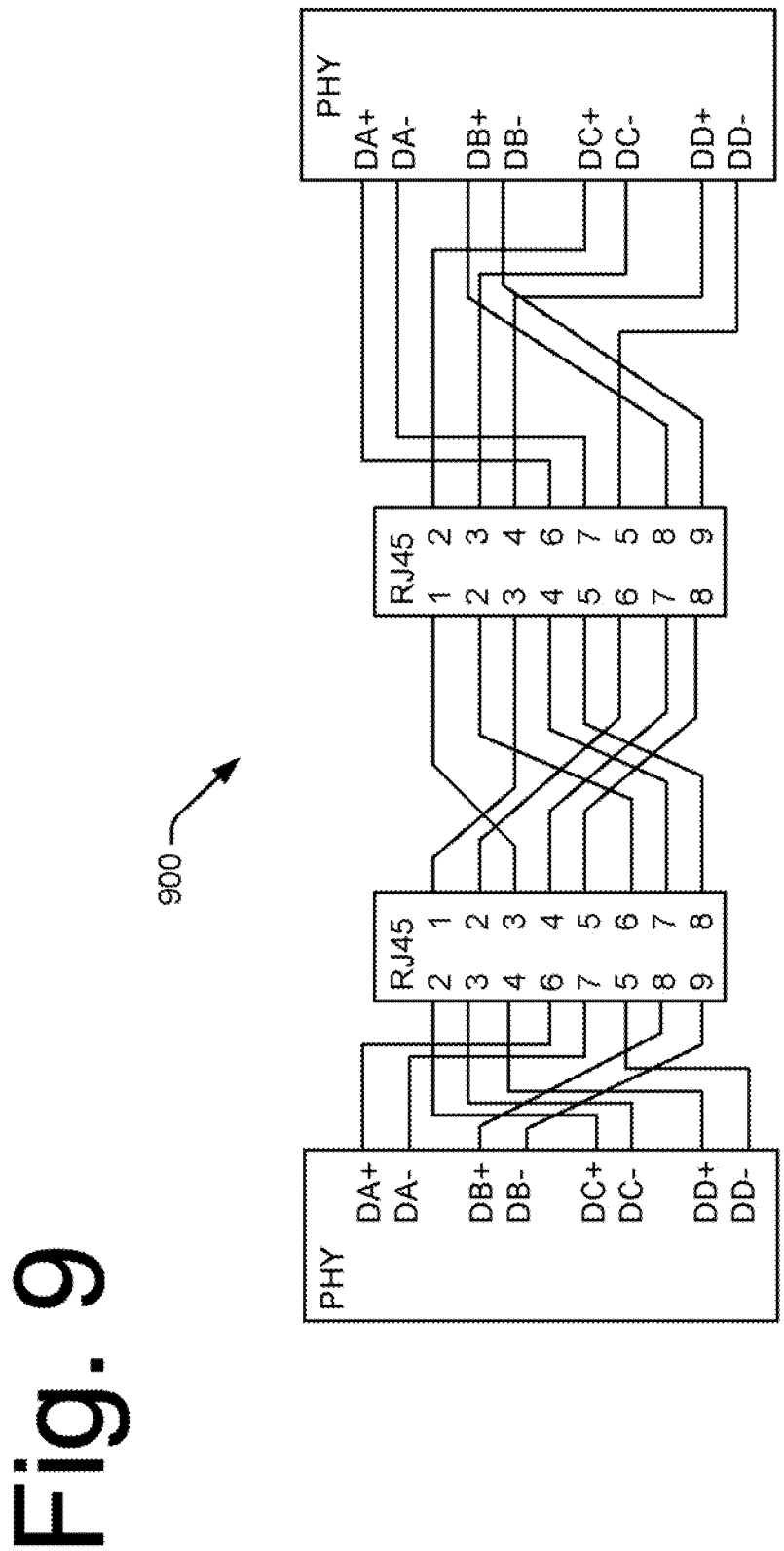
FIG. 9 shows exemplary wiring, including a security cable.
Figure 10:
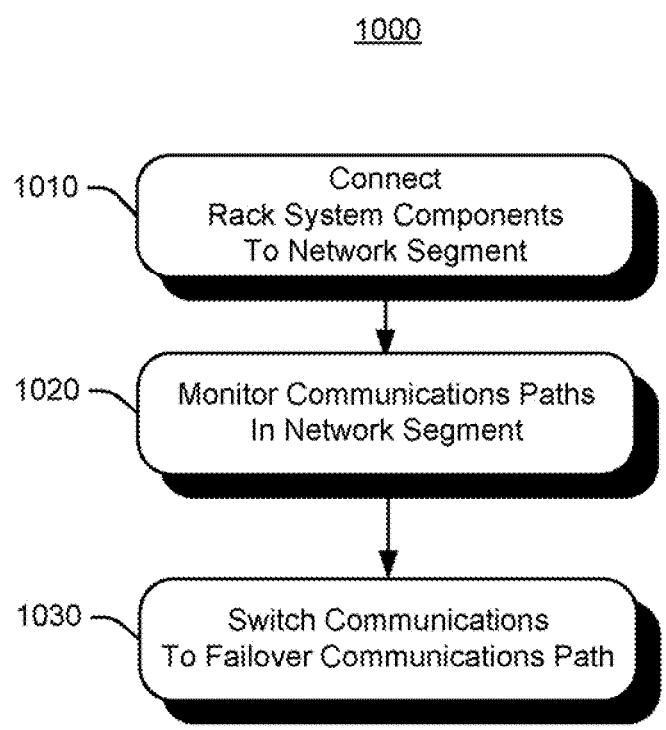
FIG. 10 is a flowchart illustrating exemplary operations which may be implemented by a rack system in a redundant, fault-tolerant management fabric.

FIG. 9 shows exemplary wiring 900 which may be implemented for a crossover cable. In the figure, the cable-side pin numbers correspond to standard RJ45 numbering. The PHY-side pin numbers are unique to the specific integrated magnetics RJ45 connector used on the board designs disclosed herein. It is noted that the combination of MDI-C wiring on both ends of the link and an industry-standard MDI-X crossover cable gives the same end-to-end, pair-to-pair connection as standard 802.3 wiring. CAMNet links carried over the midplane use the midplane to board connector appropriate for the board type. Of course the wiring shown in FIG. 9 is only illustrative and not intended to be limiting. Other wiring configurations may also be implemented based on the teachings herein.

FIG. 10 is a flowchart illustrating exemplary operations which may be implemented by a rack system in a redundant, fault-tolerant management fabric. Operations 1000 may be embodied as logic instructions on one or more computer-readable medium. When executed on a processor, the logic instructions cause a general purpose computing device to be programmed as a special-purpose machine that implements the described operations. In an exemplary implementation, the components and connections depicted in the figures may be used to provide a redundant, fault-tolerant management fabric for multipartition servers.

In operation 1010, an exemplary method may include connecting a plurality of rack system components to a first network segment. The connection may include at least two physical links sharing a single network address. In operation 1020, an exemplary method may include monitoring communications paths in the first network segment. In operation 1030, an exemplary method may include switching communications from the first network segment to a failover network segment if there is a failure in any of the communications paths in the first network segment.

The operations shown and described herein are provided as illustrative of operations an exemplary enterprise-class server system may implement in a redundant, fault-tolerant management fabric. It is noted that the operations are not limited to the ordering shown. Still other operations may also be implemented.

It is noted that the exemplary embodiments shown and described are provided for purposes of illustration and are not intended to be limiting. Still other embodiments are also contemplated.

The invention claimed is:

1. A method of providing a redundant, fault-tolerant management fabric for multipartition servers, comprising:
communicatively coupling a first rack system component to a first physical layer transceiver (PHY) through a first physical link and to a second PHY through a second physical link, wherein the first physical link and the second physical link are addressable via a single network address;
communicatively coupling a second rack system component to a third PHY through a third physical link and to a fourth PHY through a fourth physical link, wherein the first PHY and the third PHY are communicatively coupled to a fabric management processor (FMP) via a media access controller (MAC) and the second and fourth PHYs are communicatively coupled to each other, wherein only one of the first and the third PHYs is active at a time and the first and the third PHYs are connected via a physical layer interface, and wherein the first physical link is part of a first network segment and the second physical link is part of a failover network segment;
monitoring communications paths in the first network segment; and
switching communications from the first network segment connected on the first physical link to the failover network segment connected on the second physical link if there is a failure in any of the communications paths in the first network segment.

2. The method of claim 1, wherein the first rack system component comprises one of a utility board, an OA board, and a system board.

3. The method of claim 1, comprising isolating the first rack system component and the second rack system component from other networks.

4. The method of claim 3, wherein isolating is via a standard connector configured for security.

5. A system with a redundant, fault-tolerant management fabric for one or more multipartition servers, the system comprising:
a plurality of rack system components;
a fabric management processor (FMP) communicatively coupled to a media access controller (MAC) and two physical layer transceivers (PHYs) with only one of the PHYs active at a time and with the PHYs connected via a physical layer interface, wherein a first rack system component is coupled to a first PHY of the PHYs through a first physical link and a second rack system component is coupled to a second PHY of the PHYs through a second physical link;
a third PHY coupled to the first rack system component through a third physical link;
a fourth PHY coupled to the second rack system component through a fourth physical link, wherein the fourth PHY is also coupled to the third PHY, and wherein the first and second physical links form part of a first network segment and the third and fourth physical links form part of a failover network segment;
wherein each of the rack system components includes a management processor, each management processor simultaneously connected via at least two physical links each assigned a same network address, wherein only one of the physical links is operable at any given time and the other physical links are for failover; and
a processor executing program code to monitor communications paths in the first network segment, the processor executing program code to switch communications from the first network segment on one of the physical links to the failover network segment on another of the physical links if a communications path fails.

6. The system of claim 5, further comprising a utility board for each of the first network segment and the failover network segment, the utility board for each of the first network segment and the failover network segment providing a distribution function between the first network segment and the second network segment.

7. The system of claim 6, wherein the utility board for each of the first network segment and the failover network segment includes at least one switch for providing the distribution function between the first network segment and the second network segment.

8. The system of claim 5, further comprising an OA board to connect shared resources to the at least one management processor.

9. The system of claim 5, wherein the FMP is to switch communications from the first network segment to the failover network segment if the communications path fails.

10. The system of claim 5, further comprising a connector configured for security by isolating the first rack system component and the second rack system component from other networks.

11. The system of claim 10, wherein the connector implements a standard connector.

12. A system comprising:
a plurality of components in a rack system, each component having a single network address, a first physical link, and a second physical link, wherein the single network address is shared between the first physical link and the second physical link to speed switchover time from the first physical link to the second physical link on failure, and wherein only one of the first physical link and the second physical link is operable at any given time;

a fabric management processor (FMP) communicatively coupled to a media access controller (MAC) and two physical layer transceivers (PHYs) with only one of the PHYs active at a time and with the PHYs connected via a physical layer interface, wherein a component of the plurality of rack system components is connected to a first PHY of the PHYs through the first physical link to form a first network segment and is connected to another PHY through the second physical link, wherein the another PHY is part of a second network segment; and a processor executing program code to monitor communications paths in the first network segment, the processor executing program code to switch communications over one of the physical links from the first network segment to the second network segment via another of the physical links if a communications path fails, thereby providing a redundant, fault-tolerant management fabric.

13. The system of claim 12, wherein the plurality of components include at least a utility board, and an OA board connecting a central management processor to at least one of the following functional components: primary system processors, memory controllers, I/O controllers, DVD controllers, power supply controllers, voltage regulators, board information data, processor dependent hardware controllers, system processor interconnect controllers, and fan controllers.

14. The system of claim 12, further comprising two paths to each of the plurality of components in the rack system so that all of the plurality of components are reachable even after loss of a link.

15. The system of claim 12, wherein each component is a separate physical board in the rack system.

16. The system of claim 15, wherein the plurality of components include at least one of a utility board, a blade, an I/O backplane, and a management processor on an OA board.

* * * * *